United States Patent
Jordan et al.

(10) Patent No.: US 7,492,920 B2
(45) Date of Patent: Feb. 17, 2009

(54) METHOD FOR ROBUST ASYMMETRIC MODULATION SPATIAL MARKING WITH SPATIAL SUB-SAMPLING

(75) Inventors: Frederic Jordan, Les Paccots (CH); Martin Kutter, Puidoux (CH)

(73) Assignee: Alpvision SA, Vevey (CH)

( * ) Notice: Subject to any disclaimer, the term of this patent is extended or adjusted under 35 U.S.C. 154(b) by 701 days.

(21) Appl. No.: 10/527,706

(22) PCT Filed: Sep. 19, 2003

(86) PCT No.: PCT/IB03/04178

§ 371 (c)(1),
(2), (4) Date: Mar. 11, 2005

(87) PCT Pub. No.: WO2004/028140

PCT Pub. Date: Apr. 1, 2004

(65) Prior Publication Data

US 2006/0147082 A1 Jul. 6, 2006

(30) Foreign Application Priority Data

Sep. 20, 2002 (CH) .................................. 1595/02

(51) Int. Cl.
*G06K 9/00* (2006.01)
*G06K 9/32* (2006.01)
*G06K 1/00* (2006.01)
*G09G 5/02* (2006.01)
*G06F 15/00* (2006.01)
*H04N 1/60* (2006.01)

(52) U.S. Cl. .................. 382/100; 382/299; 382/293; 345/696; 358/1.9; 283/902

(58) Field of Classification Search .................. 382/100, 382/299, 293; 345/698; 283/902
See application file for complete search history.

(56) References Cited

U.S. PATENT DOCUMENTS 4,908,873 A * 3/1990 Philibert et al. ............. 382/100

(Continued)

FOREIGN PATENT DOCUMENTS

EP          0 789 480 A      8/1997

(Continued)

OTHER PUBLICATIONS

Kutter et al. "Digital Watermaking of Color Images Using Amplitude Modulation" Journal of Electronic Imaging 7(2), pp. 326-332—Apr. 1998.*

(Continued)

*Primary Examiner*—Vikkram Bali
*Assistant Examiner*—Mia M Thomas
(74) *Attorney, Agent, or Firm*—Harness, Dickey & Pierce P.L.C.

(57) ABSTRACT

Example embodiments relate to a method for applying a special mark, that is invisible to the naked eye, on a medium. That is, the example embodiments provide a method for generating and applying on a medium a digital spatial mark of X×Y dots in accordance with a resolution of d1x by d1y dots per surface unit, provided that the ratio d1x/d2x and or d1y/d2y is more than 1. The method further includes over-sampling the digital spatial mark in X based on a factor nx=d1x/d2x and in Y based on a factor ny=d1y/d2y; eroding the dots to be applied so as to leave one dot every nx dots in X and one dot every nx dots in Y; and applying the spatial mark on the support.

12 Claims, 5 Drawing Sheets

U.S. PATENT DOCUMENTS

| | | | | |
|---|---|---|---|---|
| 5,490,218 | A * | 2/1996 | Krug et al. | 382/100 |
| 5,568,550 | A * | 10/1996 | Ur | 382/306 |
| 5,647,010 | A * | 7/1997 | Okubo et al. | 382/100 |
| 5,689,587 | A * | 11/1997 | Bender et al. | 382/232 |
| 5,752,152 | A * | 5/1998 | Gasper et al. | 399/366 |
| 5,825,892 | A * | 10/1998 | Braudaway et al. | 380/51 |
| 6,092,732 | A * | 7/2000 | Curry | 358/3.28 |
| 6,343,138 | B1 * | 1/2002 | Rhoads | 382/100 |
| 6,345,104 | B1 * | 2/2002 | Rhoads | 382/100 |
| 6,549,638 | B2 * | 4/2003 | Davis et al. | 382/100 |
| 6,671,386 | B1 * | 12/2003 | Shimizu et al. | 382/100 |
| 6,738,491 | B1 * | 5/2004 | Ikenoue et al. | 382/100 |
| 6,768,809 | B2 * | 7/2004 | Rhoads et al. | 382/100 |
| 6,786,420 | B1 * | 9/2004 | Silverbrook | 235/494 |
| 6,810,131 | B2 * | 10/2004 | Nakagawa et al. | 382/100 |
| 6,853,736 | B2 * | 2/2005 | Miyake | 382/100 |
| 7,000,113 | B1 * | 2/2006 | Linnartz | 713/176 |
| 7,113,615 | B2 * | 9/2006 | Rhoads et al. | 382/100 |
| 7,266,215 | B2 * | 9/2007 | Ikenoue et al. | 382/100 |
| 7,266,216 | B2 * | 9/2007 | Braudaway et al. | 382/100 |
| 7,286,684 | B2 * | 10/2007 | Rhoads et al. | 382/100 |
| 7,302,303 | B2 * | 11/2007 | Reefman et al. | 700/94 |
| 7,336,721 | B2 * | 2/2008 | Lee et al. | 375/295 |
| 7,346,134 | B2 * | 3/2008 | Smith | 375/346 |
| 7,409,073 | B2 * | 8/2008 | Moskowitz et al. | 382/100 |
| 7,412,074 | B2 * | 8/2008 | Powell et al. | 382/100 |
| 2002/0061143 | A1 * | 5/2002 | Konoshima | 382/299 |
| 2003/0021437 | A1 * | 1/2003 | Hersch et al. | 382/100 |
| 2003/0063772 | A1 * | 4/2003 | Smith et al. | 382/100 |
| 2003/0215110 | A1 * | 11/2003 | Rhoads et al. | 382/100 |
| 2005/0041263 | A1 * | 2/2005 | Ishikawa et al. | 358/1.14 |
| 2005/0078331 | A1 * | 4/2005 | Guan et al. | 358/1.14 |
| 2006/0056736 | A1 * | 3/2006 | Lieberman et al. | 382/299 |
| 2006/0120614 | A1 * | 6/2006 | Flierl et al. | 382/240 |
| 2006/0136746 | A1 * | 6/2006 | Al-Khateeb | 713/189 |
| 2007/0092102 | A1 * | 4/2007 | Kot et al. | 382/100 |
| 2008/0170746 | A1 * | 7/2008 | Carr et al. | 382/100 |

FOREIGN PATENT DOCUMENTS

| | | |
|---|---|---|
| EP | 0912042 A2 * | 10/1998 |
| WO | WO 97/40619 A | 10/1997 |

OTHER PUBLICATIONS

Solachidis et al. "Circularly Symmetric Watermark Embedding in 2-D DFT Domain" IEEE Transactions on Image Processing, vol. 10, No. 11, Nov. 2001, pp. 1-13.*

Tefas et al. "Robust Spatial Image Watermarking Using Progressive Detection", pp. 1973-1976.*

Li et al. "Transparent and Robust Audio Data Hiding" pp. 1 of 4 (397-400).*

Tirkel et al. "a Two-Dimensional Digital Watermark" pp. 1 of 5.*

Kutter et al. "Digital Watermarking of Color Images Using Amplitude Modulation" Journal of Electronic Imaging 7(2) pp. 326-332 (Apr. 1998).*

Tefas et al. "Robust Spatial Image Watermarking USing Progressive Detection" 2001 IEEE, pp. 1973-1976.*

International Search Report.

* cited by examiner

METHOD FOR ROBUST ASYMMETRIC MODULATION SPATIAL MARKING WITH SPATIAL SUB-SAMPLING

TECHNICAL DOMAIN

The general domain concerns a signal and image processing technique that allows the hide data in an invisible way in digital (image, video, sound) or analogical (printed) media.

A spatial digital marking with asymmetrical modulation is an extension of the classic digital watermarks. This extension allows, in particular, the covering of the printed media by offering a solution to print a digital spatial marking in an invisible way on a uniform colour media with visible colour inks. The application domain relates to the protection of printed documents and packaging against counterfeiting and falsification.

STATE OF THE ART

The known systems intended to prevent counterfeiting or alteration of printed or engraved documents can be classified into different groups:

holograms, the marks of special designs marks with special inks or codes with invisible inks chip or antenna systems Holograms, special designs and other decorations are difficult to reproduce since their production requires special equipment. They are specially designed to interfere with traditional photocopy systems so that the copy is visibly different to the original. These systems can be visually controlled without the aid of particular devices but they present the drawback of being expensive and they are well enough known by counterfeit specialists to be reproduced without problems and finally their visibility deserves the aesthetics of the protected object (perfume packaging for example). Their visibility is also the reason for their limited efficiency since a counterfeiter can easily identify the security element, either by copying the element or removing it physically.

The marks with special inks use the particular chemical properties of the ink to provide a determined reaction to a particular action. Therefore, fluorescent inks become very bright when they are illuminated by a particular wavelength, certain inks are invisible in natural light while other inks change colour according to their orientation or temperature (and may be revealed by heating the paper with a finger), etc. In general, special inks are particularly expensive and for operation require modifications in the usual industrial production chain (supplementary mask for the offset, for example). Furthermore, although more difficult to counterfeit than the previous group, it is also possible to reproduce their effects insofar as a counterfeiter himself can control the authenticity of his copy by making a comparison to the original since said counterfeiter disposes of the device that makes the inks react.

The codes using invisible inks, unlike the two previous groups, allow the concealment of digital information. These codes can be characters, bars codes, 2 D codes, etc. In addition to the high cost characteristic of invisible inks, this system has two major drawbacks. On one hand, due to the nature of the codes used, the system is located on a certain area of the document or packaging and it is thus possible to destroy it without altering the totality of the surface. On the other hand, the codes used always have geometric particularities (bars, geometrical figures, characters, etc) clearly identifying them as anti-copy devices.

This greatly facilitates the task of the counterfeiter attempting to reveal and reproduce the ink. Furthermore, when the counterfeiter knows how to make this reproduction, he has in his possession ipso facto the means to reproduce the code. Finally, the systems based on embedded storage or processors accrue the drawbacks of being very expensive, unattractive and localised. Their main application consists more in securing communication or dynamically storing a piece of information rather than distinguishing an original from a copy.

The digital watermark technique, also known under the name digital tattooing, is a technique that allows data concealment in a strong and imperceptible way in multimedia data such as music, video, images, documents, etc. The information that is concealed is called the signature. This signature can be, for example, a number, a name or an image. After the protection of the multimedia data with a digital watermark reference is made to a signed image, a signed video, etc.

Numerous publications have been written on the different techniques allowing the concealment of a watermark in an image, in a video or an audio signal. With regard to the images, the latter can be classified according to the technique used for marking: certain techniques carry out modifications directly in the spatial domain (see for example [1] M. Kutter, F. Jordan, F. Bossen, "Digital watermaking of color images using amplitude modulation", Journal of Electronic Imaging, vol. 7, no. 2, pp. 326-332, April 1998.), others carry out these modifications in a transformed domain (for example the frequency domain) see intermediate domains such as wavelets (see [2] Shelby Pereira, Sviatoslav Voloshynovskiy and Thierry Pun, Optimized wavelet domain watermark embedding strategy using linear programming, In Harold H. Szu and Martin Vetterli eds., *Wavelet Applications VII (part of SPIE AeroSense* 2000), Orlando, Floride USA, April 26-28 2000.).

The process described in the patent number WO0225599 (priority CH20000001832 20000920) extends digital watermark technology to a printed media by means of an asymmetrical modulation of an independent signal of the underlying support and called in the following "spatial marking". Among the interests of this approach, the invisible printing on paper of uniform colour (white in particular), or the overlay on the printed matter (obtained by offset in particular) can be cited. The detection of this signal requires a digital scanner. A notable limitation of this approach is that the digital scanner must have at least the same resolution as that used to print the marking. This limitation, for example, is restrictive in the industrial domain because the high-speed scanners used to digitize the documents are incompatible with this invention. In fact, the high-speed scanners function at resolutions typically around 200 dpi, but a printed spatial marking at this same resolution of 200 dpi can be detected by the naked eye and copied with a photocopier.

This invention describes a process to remove this constraint and thus allow the use of a low-resolution scanner (or any other optical acquisition method) to detect a high-resolution printed spatial marking. Therefore, it allows, for example, the printing of a spatial marking at 600 dpi (resolution compatible with industrial printers) and detection at 200 dpi (resolution compatible with industrial scanners).

BRIEF DESCRIPTION OF THE INVENTION

A spatial marking is presented as an almost random scatter of points in spatial distribution. In the following, <<printing resolution>> is defined on the basis of the effective size of the spatial marking once printed in relation to its size in pixels, and not as the maximum resolution of points per unit of length that the printer can supply.

For example, considering a spatial marking of 300 by 300 pixels, printed with a printer with resolution 1200 dpi. Supposing that the size obtained after printing was 1 inch by 1 inch. In this case, it is considered that the effective resolution of printing is 300 points per inch (or 300 dpi), and not 1200 dpi.

In order to illustrate the critical character of the respective resolutions of printing and digitization, an example is given in the following for the particular case of the determination of the vertical positioning of two points. When the spatial marking is printed at a resolution of d points per unit of length, the size of the points has a diameter of approximately 1/d. A digitization of these points can be carried out with a scanner having a resolution d: the size of printed points being identical to the digitizer resolution, it is possible distinguish said points (the base point is placed to the right of the top point). In the case of a digitization carried out at a lower resolution (for example two times lower), the possibility of discrimination is theoretically impossible. In this case, the digitizer digitizes both points as belonging to the same line. The two points are not distinguished and the scanner considers that it is in fact one point.

The same reasoning is also valid for the horizontal resolution of the image. This limitation thus seems to be fundamentally intrinsic to spatial marking technology and up to now it has been accepted that the digitization resolution cannot under any circumstances be lower than that of printing.

Nevertheless, the following process shows that such a possibility exists: a solution consisting in spacing out the points in order to compensate exactly the resolution difference between printing and digitization. In this case, supplementary blank lines have been inserted allowing a vertical spacing of the points of 2/d.

The notable advantage of this invention is that it allows the detection of a spatial marking with numerous systems based on low-resolution digital scanners. This is the case in particular with high-speed digitizers used for paper documents (cheques, bank transfers, etc.) but also for certain card readers.

The relationship between the printing resolution and the reading resolution is typically comprised between 2 and 5.

Another advantage of the system is that it allows the increase of the invisibility of the spatial marking by using the two following phenomenon:
  Point size reduction
  Reduction of the concentration of points per printed surface unit
These parameters are mathematically quantified below.

DETAILED DESCRIPTION OF THE INVENTION

Figure 1:
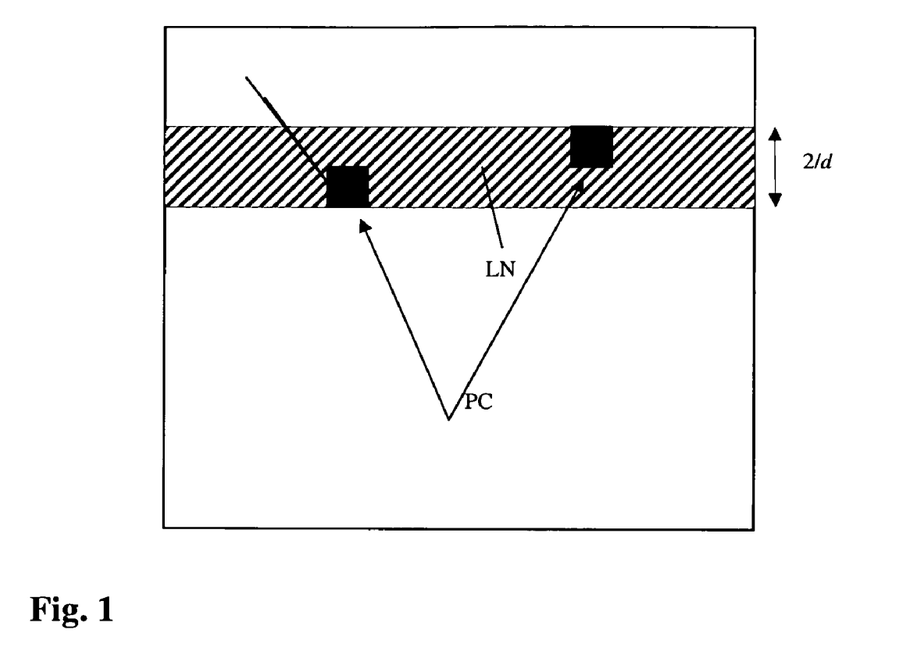
FIG. 1: Representation of the signal and area digitized by a scanner with a resolution two times lower than the size of the points.

FIG. 1 shows a band of a scanner with a resolution lower than the resolution of the points PC applied on this band LN. The scanner is active on a band LN with a resolution 2/d or half lower than the printing resolution 1/d.

Figure 2:
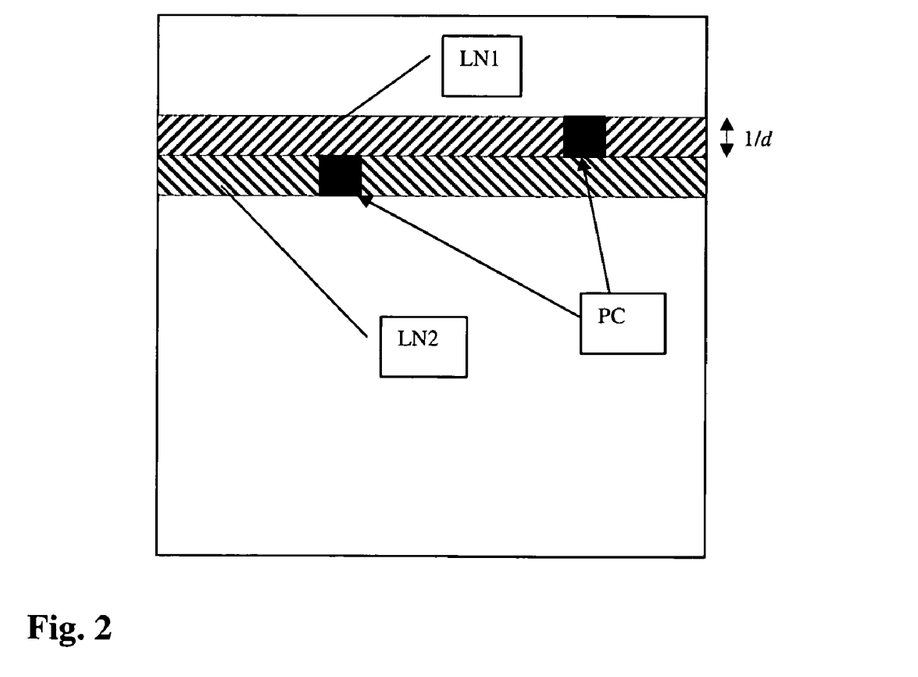
FIG. 2: Representation of the signal and area digitized by a scanner with a resolution identical to the size of the points.

In FIG. 2, the scanner is of a resolution 1/d equivalent to the printing resolution. The reading of the first line LN1 and the second line LN2 allows the detection without problem of the points PC of this spatial marking.

Figure 3:
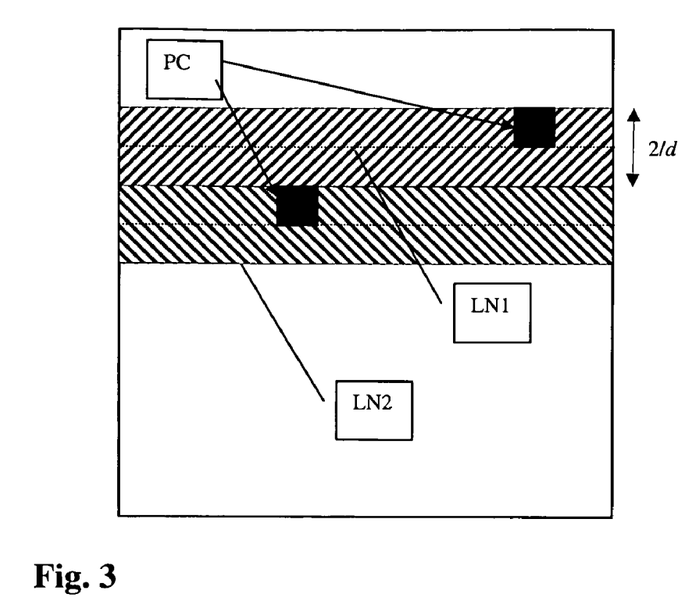
FIG. 3: Use of a digitization resolution lower than that of printing.

FIG. 3 shows a printed spatial marking with a resolution 1/d (the resolution of points PC). The size of the point PC is half lower than the width of the acquisition band 2/d of a scanner.

Figure 4:
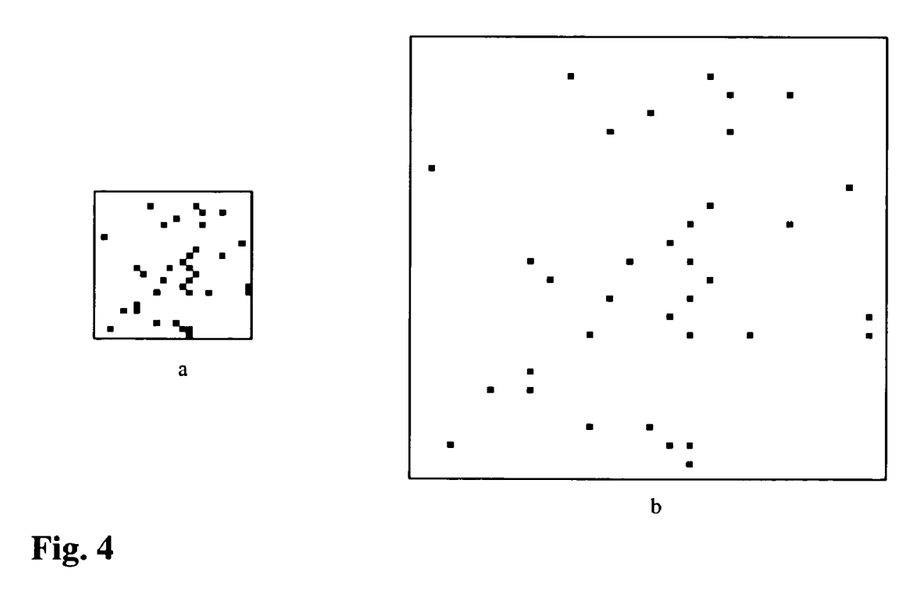
FIG. 4: Illustration of the change of spacing for the vertical and horizontal dimension.

FIG. 4 shows the printing result of a spatial marking, FIG. 4a being the spatial marking base and FIG. 4b being the printed spatial marking. Both spatial markings have an identical number of points. This example is based on a printing ratio on the resolution of the scanner of 3. It is noted that the surface used by the spatial marking base 4a is 3 times smaller than the printed spatial marking 4b. At the same time, each printed point is spaced at a minimum of 2 non-printed points.

Figure 5:
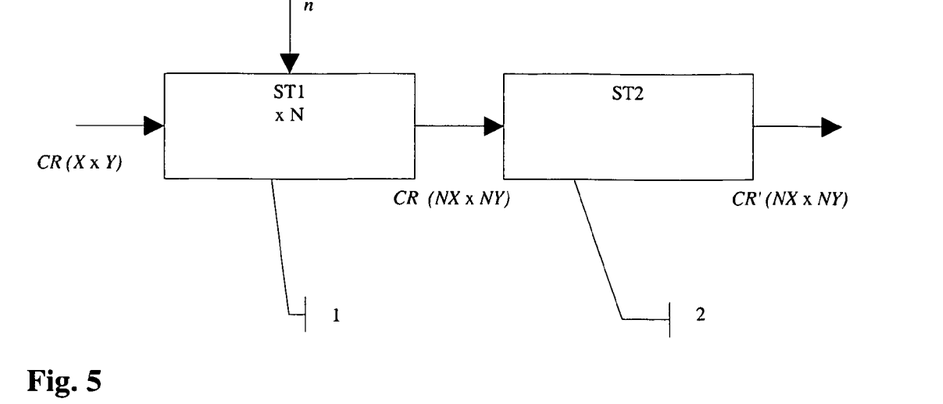
FIG. 5: Diagram of the process allowing the obtainment of a sub-sampled and eroded spatial marking.

An embodiment method of the invention is based on a post-processing procedure of a spatial marking image illustrated by the diagram in FIG. 5. A standard spatial marking of almost random distribution with a size X×Y is first generated. The latter is then sub-sampled in a binary way with a factor n in its horizontal and vertical dimensions by a first module ST1. The result is a spatial marking CR with a size NX×NY whose points, in particular, encoding the signal—carriers of the redundant information—henceforth have a size of N×N. This image is then reprocessed by means of an erosive filter ST2 leading again to some points with a size of 1×1 but in an image always forming NX×NY. This process is thus qualified as <<erosive sub-sampling>>.

Figure 6:
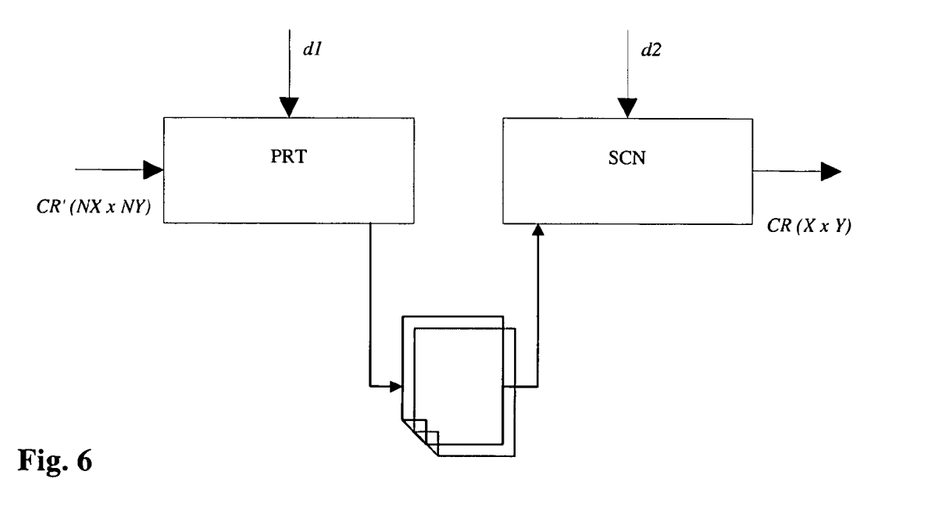
FIG. 6: Diagram of the implementation of the spatial marking modified by printing and detection.

The implementation of the printing and detection of the spatial marking obtained in this way is shown in FIG. 6. In a first step PRT, the spatial marking CR' (NX×NY) is first printed with a resolution d1. The printed support obtained in this way is subsequently digitized in the module SCN with a resolution d2. As previously mentioned, the object of this invention is precisely that d2<d1.

There is a ratio mathematically connecting the post-processing procedure with the implementation of spatial marking. The latter is given by:

$$n = \frac{d_1}{d_2}$$

For example, a spatial marking can be printed with a resolution of d1=300 dpi and scanned with a resolution of d2=100 dpi. In this case, the ratio of the resolutions is n=3, which means that the number of horizontal and vertical points defining the printed spatial marking CR' is 3 times higher then that obtained after digitization.

Digitalization with a resolution d2 of the post-treated spatial marking leads to a contrast reduction between the digitized points and the background that depends on the ratio n. The final colour c' of the digitized point can be calculated: considering b the background colour and c the colours of the points of the spatial marking (both comprised between 0 and 1). c' is then calculated taking account the fact that there is only one colour c and $n^2-1$ points in colour b:

$$c' \frac{b \cdot (n^2 - 1) + c}{n^2}$$

In the particular case of a black signal c=0 on a white background b=1, it can be ascertained that c'>c, and that this average colour is similar to that of the background (b=1), especially when n is large. The contrast of the signal in relation to the background is thus decreased, which increases the invisibility at the same time as the noise signal ratio that characterizes the clarity of the spatial marking in relation to the support on which it is printed. For example, for n=3, a black signal c=0 on a white background b=1, the colour of the digitized point will be c'=0.88. This corresponds to a contrast decrease with the background colour of 88% in relation to the initial colour of the black point.

The method described above can be applied to the case of an anisotropic processing of spatial marking. In this case, the resolutions used for digitization and printing are different according to the directions x and y. As this method acts independently on each of these directions, it can be applied directly. The ratios are then applied by considering the resolution according to the directions x and y used for printing (resp. d1x and d1y) and those used for digitization (resp. d2x and d2y) giving the erosive sub-sampling factor according to the directions x and y, respectively nx and ny:

$$nx = \frac{d_{1x}}{d_{2x}}$$

$$ny = \frac{d_{1y}}{d_{2y}}$$

These factors are in particular applicable in the case of industrial jet ink printers where the scrolling speed of the paper is susceptible to create a different resolution in the two sizes, a similar effect can also be observed on a scanner.

Figure 7:
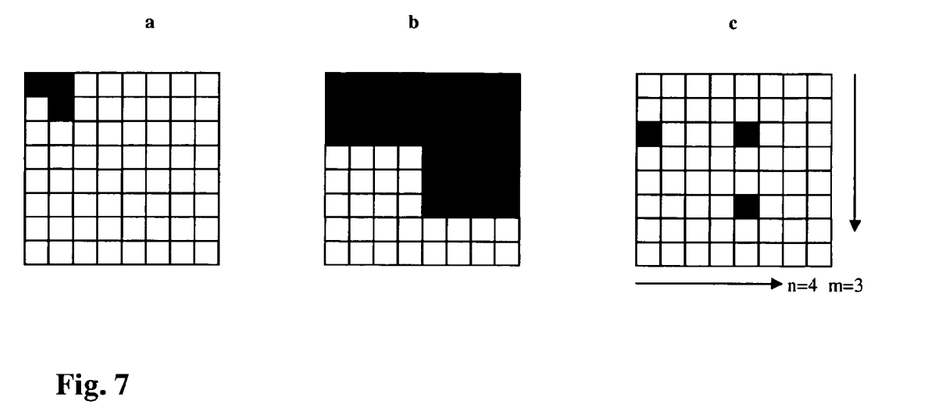
FIG. 7: Illustration of the of sub-sampling and erosion function

FIG. 7 shows the preparation process of a spatial marking according to the invention.

FIG. 7a shows the spatial marking base with a resolution d. The first stage is the stage of sub-sampling according to the resolution on the scanner. According to the example illustrated in FIG. 7b, the resolution in x is four times (n) lower and the resolution in y is three times (m) lower than that of printing.

To illustrate the erosion process, FIG. 7c shows an alternative that consists of choosing only one of the points according to its position. Therefore, according to this example, the retained point is that which is low down and to the left. The resulting spatial marking necessarily includes spaced points so that only one point is taken during an acquisition at the maximum resolution of the scanner.

Figure 8:
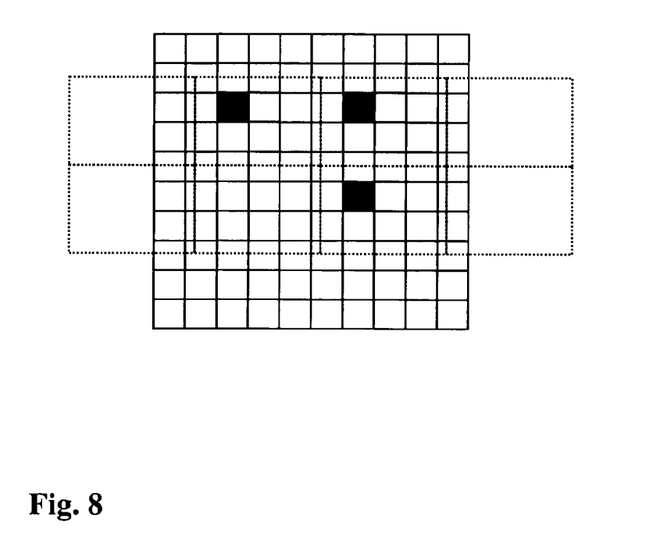
FIG. 8: Representation of the acquisition by a scanner of a spatial marking

The processing of the scanner is disclosed in FIG. 8. Its functioning is essentially asynchronous and each acquisition area does not correspond inevitably with the division of the spatial marking during printing. An acquisition area is illustrated by a dotted line. It can be observed that for a given area, only one spatial marking point remains which authorizes effective processing.

General Concept of Spatial Marking

The design of spatial marking comes down to which points must be printed and which must be allowed to appear on the background of the document. This concept takes into account the method used for decoding.

The decoding of the spatial marking requires the use of its autocorrelation, intercorrelation and statistical correlation properties with the encoded data respectively to compensate the affine geometrical transformations, the translations and the possible noise of the signal. The autocorrelation and correlation properties are defined at the time of the conception of the spatial marking and must take into account the level of sub-sampling desired. At the theoretic level, the points encode a binary piece of information according to a spectrum display process and these points are also selected so that the image obtained has autocorrelation properties (see for example M. Kutter, F. Jordan, F. Bossen, "Digital watermaking of color images using amplitude modulation", Journal of Electronic Imaging, vol. 7, no. 2, pp. 326-332, April 1998). The paragraphs below describe an embodiment of a conception method of a correlated spatial marking to a binary piece of information and an autocorrelated spatial marking.

Conception of a Correlated Spatial Marking with a Binary Piece of Information

Taken $i=\{-1,1\}$ the value of a bit to be encoded. Taken $\{x,y\}$ a group of pseudo randomly chosen points (on the base of a key) among all the points of the image X×Y and k an index identifying each of the coordinates $\{x,y\}$ of these points. Taken a(k) a pseudo random generator defined by a second key and giving the values $\{-1,1\}$. Taken v, a colour comprised between 0 (black/colour) and 1 (white). Either c(k) the final colours of the point k of the spatial marking. The following formula is then applied:

If $i.a(k)>0$ then $c(k)=V$ if not $c(k)=1$

For example, if only one bit is encoded with v varying from 0 to 99, a spatial marking colour v=0, and a(k)=k module 2, this means that the image of the spatial marking will be composed of 50 black points and 50 white points, all the other points of the spatial marking remaining white. These points encode this bit with a redundancy of 100.

Conception of an Autocorrelated Spatial Marking

A method allowing a spatial marking to be obtained presenting an autocorrelation property consists in conceiving the digital image of the spatial marking by duplicating the group of points $\{x,y\}$ 4 times. This duplication can be carried out by translating the group of points according to 4 vectors defined by (0,0), (0,s), (S,0), (S,S) where S defines the translation distance. It is possible to carry out this duplication using the following method:

Selection of a group of points $\{x,y\}$ so that the coordinates (x,y) are pairs Selection of an uneven translation distance S Creation of the spatial marking with the 4 groups of points $\{x,y\}$, $\{x+S,y\}$, $\{x,y+S\}$, $\{x+S,y+S\}$ This method guarantees that any of the points of the 4 groups do not superpose.

Figure 9:
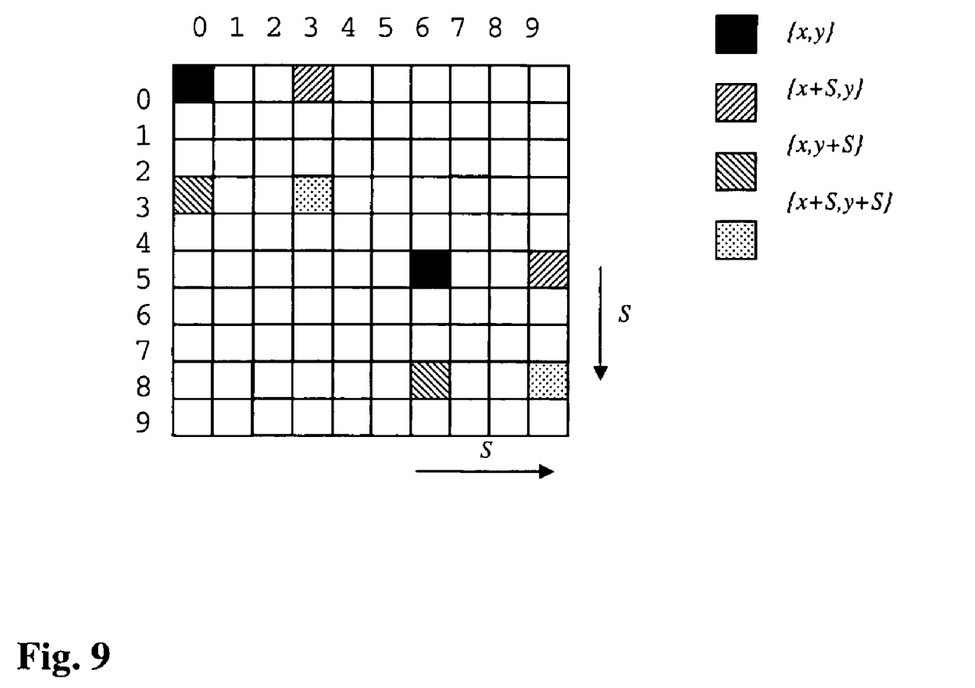
FIG. 9: Illustration of an auto-correlated spatial marking

FIG. 9 shows this approach with a group $\{x,y\}$ comprising 2 points and a translation S=3.

During this operation, certain points are capable of having coordinates outside the size of the image of the spatial marking X×Y. One method consists in carrying out the translation by using a modulo on the size of the image. The following formulas illustrate the module method for the horizontal coordinate x:

$\{x+S\}=x+S$ if $x+S<X$ $\{x+S\}=x+S-X$ if $x+S>X$

The same principle is applied to the coordinate y.

Autocorrelation introduced in this way is used to compensate an affine type geometric transformation possibly produced by the digital acquisition of the spatial marking. Thus x,y are the coordinates of a point of the cryptoglyph before printing and x',y' are the coordinates of this point after digitization, the affine relation between these coordinates is written:

$$x'=ax+by$$

$$y'=cx+dy$$

Once the coefficients (a,b,c,d) are determined from the position of the autocorrelation figure, it is thus possible to establish the original coordinates (x,y) by compensating the geometric transformation induced by the digital acquisition.

Conception of a Strong Spatial Marking for Sub-Sampling

In the particular case of this invention, the decoding of the signal is made difficult because the sub-sampling produced by low-resolution digitization entails a reduction of contrasts between the points and the background colour, this contrast reducing further with the square of n. Two solutions are used to compensate this reduction of the noise signal ratio:

Increase of encoding redundancy

For one image of the size X×Y, encoding redundancy is defined by the following formula:

$$r = \frac{X \cdot Y \cdot p}{b}$$

wherein the density p, comprised between 0 and 1, defines the ratio of printed points in relation to the size of the image in pixels, and b defines the number of encoded bits. Therefore, if one considers the image of spatial marking with the size 100 by 100 pixels with a density of 0.1 and 10 encoded bits, a redundancy of 100 is obtained.

Increase of contrasts between the point colour and the background colour

For that it is necessary to choose an ink colour c which maximises the absolute value |c−b|.

These two solutions can be used separately or simultaneously. They are implemented empirically, knowing that:

Beyond a certain threshold that depends among other things on printing colour, on printing support and on printing resolution, it is not possible to increase simultaneously the density and contrast because the spatial marking becomes visible.

The redundancy value cannot decrease under a certain threshold that depends on alterations that the printed support is capable of undergoing, without this decoding errors may occur.

Implementation of the Spatial Marking Properties for the Detection Process

The properties of the spatial marking defined previously allow the execution of a reliable decoding that develops according to the following steps digital acquisition of an image of the support, filtering on the obtained image to eliminate the parts not comprising the spatial marking. This filtering can take into account the characteristics of a graphic possibly printed on the support. It can be carried out by using a compensation based on a uniform colour or by means of a prediction of the colours of the support before printing of the graphic. This type of prediction can be made by a soundproofing filter (of the Wiener type, for example).

use of the autocorrelation properties to compensate every affine transformation introduced by the acquisition, as well as previously described.

compensation in translation of the spatial marking using an intercorrelation between the spatial marking obtained and the group of possible positions of the spatial marking defined by a key, decoding of the digital information by statistical correlation for each bit of the information.

Other Marking Processes

In the foregoing there is essentially the process of marking by printing that has been cited. However, all processes that lead to obtaining a point that can be distinguished in relation to a background can be used. For example, and in a non-exhaustive way, engraving by laser of points on a glass surface to conceal an invisible code can be cited. It is also possible to use points presenting the magnetic particularities different to those of the background.

Other Acquisition Processes

Example embodiments can be directly applied to the detection of non-optical properties of points (electric, magnetic, position in depth/height). The digital acquisition process of the spatial marking of a surface (product or document) can also be completely dissociated from the digital processing procedure thus allowing the detection of this marking. For example, it is possible to photograph digitally a marked surface and send the image on a network to a remote computer that carries out the detection, i.e., two geographical remote locations. The result of this detection can also be sent again to the operator. The development of portable detectors e.g., mobile telephones, disposing of a low-resolution camera makes the process of the invention very attractive.

The invention claimed is:

1. A method of generating and applying on a support of a digital spatial marking of X×Y points according to a resolution of d1x by d1y points per surface unit and intended to be read by a reading device with a resolution of d2x by d2y points per surface unit, taking into account that the ratio d1x/d2x and/or d1y/d2y is larger than 1, the method comprising:

defining a pseudo-random digital mark in a resolution d2x by d2y, over-sampling the digital mark in X according to a factor nx=d1x/d2x and in Y according to a factor ny=d1y/d2y in order to obtain a digital mark according to a resolution d1x by d1y, eroding the X×Y points intended to be applied so as to guarantee that a minimum distance between said X×Y points is respectively nx and ny in horizontal and vertical directions, and applying the digital spatial marking on the support.

2. The method of generating and applying the digital spatial marking according to claim 1, wherein the resolution of the reading device is identical in X and in Y (d2x=d2y).

3. The method of generating and applying the digital spatial marking according to claim 1, wherein the resolution of the initial digital spatial marking is identical in X and in Y (d1x=d1y).

4. The method of generating and applying the digital spatial marking according to claim 1, wherein the ratio of resolution in X (nx) and the ratio of resolution in Y (ny) is comprised between 2 and 5, 2 and 5 inclusive.

5. The method of generating and applying the digital spatial marking according to claim 1, wherein the support is constituted by a printing process.

6. The method of generating and applying the digital spatial marking according to claim 1, wherein the support is constituted by an engraving process.

7. A method of recognizing the digital spatial marking applied according to the generation method of claim 1, comprising:

acquiring a digital image of the support, filtering the acquired digital image to eliminate parts not including the digital spatial marking, using autocorrelation properties to compensate every affine transformation introduced by the acquisition, compensating in translation of the digital spatial marking using an intercorrelation between the obtained digital spatial marking and a group of possible positions of the digital spatial marking defined by a key, and decoding the digital information by statistical correlation for each bit of information.

8. A method of detecting a digital spatial marking according to claim 7, wherein the filtering of the acquired digital image is based on a compensation of a uniform initial color.

9. A method of detecting a digital spatial marking according to claim 7, wherein the filtering stage is based on a prediction of the image of the initial support by a soundproofing filter.

10. A method of detecting a digital spatial marking according to claim 7, wherein the digital acquisition of the image is carried out by a scanner.

11. A method of detecting a digital spatial marking according to claim 7, wherein the digital acquisition of the image is carried out using a portable detector.

12. A method of detecting a spatial marking according to claim 7, wherein the acquisition and processing of the spatial marking are carried out in two geographically remote locations.

* * * * *